United States Patent

Gruler

[11] Patent Number: 5,621,399
[45] Date of Patent: Apr. 15, 1997

[54] CIRCUIT FOR A TRANSDUCER

[75] Inventor: Martin Gruler, Aixheim, Germany

[73] Assignee: Mannesmann Kienzle GmbH, VS-Villingen, Germany

[21] Appl. No.: 290,977

[22] PCT Filed: Feb. 12, 1993

[86] PCT No.: PCT/EP93/00342

§ 371 Date: Aug. 24, 1994

§ 102(e) Date: Aug. 24, 1994

[87] PCT Pub. No.: WO93/17302

PCT Pub. Date: Sep. 2, 1993

[30]     Foreign Application Priority Data

Feb. 27, 1992 [DE] Germany ............... 42 05 989.5

[51] Int. Cl.⁶ ............................................. G08C 19/10
[52] U.S. Cl. ................ 340/870.37; 324/660; 73/514.32
[58] Field of Search ................................. 324/654, 680,
324/660, 677; 340/870.37; 73/514.18, 514.32,
862.52, 718

[56]           References Cited

U.S. PATENT DOCUMENTS 4,366,716  1/1983  Yoshida ........................... 73/718
4,392,383  7/1983  Bauerlem et al. .................. 73/724
4,783,659  11/1988 Frick .............................. 340/870.37
4,878,012  10/1989 Schulte et al. ..................... 340/870.37
5,083,091  1/1992  Frick et al. ....................... 324/678
5,204,674  4/1993  Holben ........................... 340/870.37
5,321,390  6/1994  Yuen .............................. 340/566
5,424,650  6/1995  Frick .............................. 324/688
5,428,352  6/1995  Bennett ........................... 324/679

Primary Examiner—Thomas Mullen
Assistant Examiner—Timothy Edwards, Jr.
Attorney, Agent, or Firm—Anderson, Kill & Olick P.C.

[57]           ABSTRACT

A circuit arrangement for an analytical function generator with a capacitive differential transducer for editing the signals measured by the differential transducer into a transmittable signal at the output of the circuit arrangement which comprises two coupled RC-oscillators, wherein a first of the two oscillators is arranged in the feedback of the second of the two oscillators and the capacitance of the two oscillators is formed by one of the two partial capacitances of the differential transducer, two bistable trigger circuits connecting the two oscillators with one another, wherein one of the two trigger circuits causes a level inversion, and a gate for the linkage of the partial signals appearing at the output of the two trigger circuits so that a logic twin pulse signal corresponding to the measured magnitude or variable is generated at the output of the gate.

4 Claims, 1 Drawing Sheet

CIRCUIT FOR A TRANSDUCER

FIELD OF THE INVENTION

The present invention deals with a circuit arrangement according to the preamble of the first patent claim.

BACKGROUND OF THE INVENTION

Various circuit arrangements such as for instance bridge- and charge amplification circuits are known for analyzing sensor signals. These types of circuits require mostly more extensive technical resources for proper signal editing by microcomputers and are therefore not very cost effective. Sensor circuits operated in a LC-oscillatory circuit are also known, which provide a frequency signal, which can indeed be directly analyzed in a downstream located microprocessor for the ensuing signal processing; however they have the disadvantage that these oscillatory circuit arrangements are greatly affected by temperature changes, so that a temperature compensation located downstream is required in most application cases.

SUMMARY OF THE INVENTION

The subject of the present application is meant to use a novel method for process-equitable editing of sensor signals, which is particularly suitable for transducer applications in motor vehicles. Here the expression transducer means a device, which as a component contains the sensor element proper as well as a first electronic circuit arrangement analyzing the signal measured by the sensor, in order to provide a measured signal at the transducer output, which is suitable to be conveyed meaning to be transferred also across long distances. The special motor vehicle relevancy deals with the rough environment in which the transducer is to be operated, as for instance extreme temperature differences, as well as also with the requirement for being suitable for an economical mass production.

Therefore the invention is based upon the task, of creating a simple and thus economical analysis circuit for sensor signals from a capacitive transducer, which circuit itself compensates for temperature effects, where the sensor element can have a very small capacitance and where the circuit produces at its output an electrical signal able to be transported, which can be analyzed by a microprocessor without any additional signal conversion.

This task is solved by the characteristic features of the first and second patent claim.

The circuitry in the invention can be built up extremely economically with the simplest means. The PWM (pulse width modulated) output signal can be transmitted also across large distances without impairing the information content. The output signal is digital, thus a A/D (analog/digital) converter is not required. The pulse duration containing the information content of the magnitude measured by the sensor can be analyzed in the simplest way in the microprocessor. For instance the analysis can occur in such a way, that the duration of pulse and pause for one period can be determined by two counters of the processor. Subsequently the processor forms in a simple computational step the divisional ratio as a measure for the excursion of the mobile central electrode configured as a flexural resonator. If necessary the output signal can be converted by a simple RC (resistance capacitance) low pass filter into an analog voltage signal.

Depending upon the type of the differential transducer a trimmable very slight non-linearity is achievable by this circuit. Pertinent subsequently measured signal corrections need not be performed for many applications. The differential capacitance principle acts in a self-compensating manner in case of environmental interferences, so that for instance the temperature drift is extremely low. The circuit structure permits, due to the principle on which it is based, to achieve in actual practice a very high temperature stability and a very high resolution of the measured signal without any additional measures. This circuit has a very low inherent current consumption and also requires only a unipolar voltage source (VCC), which when CMOS (complementary metal oxide semi-conductor) structural elements are used, permits a wide voltage supply range. Since the circuit is defined so as to consist of only very few structural elements, it is very well suited for being used in small available spaces. Furthermore the circuitry can be used in a dynamic as well as a static measuring operation.

The subject of the application is explained further with the help of the drawings.

DESCRIPTION OF THE PREFERRED EMBODIMENT

Figure 1:
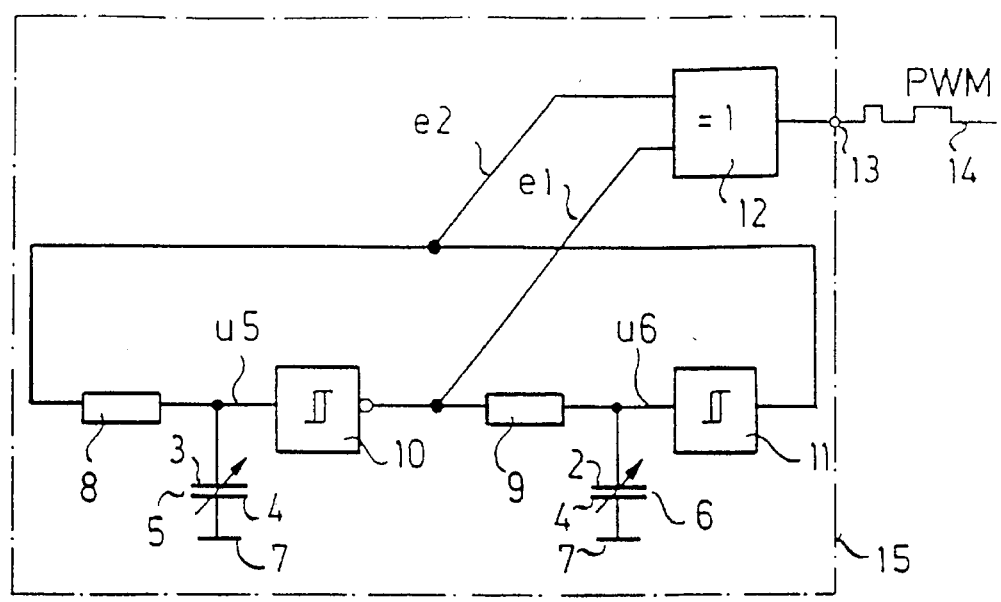
FIG. 1 shows a circuit construction of the solution in the invention.

In the circuitry in FIG. 1 the capacitive differential transducer 1 has two electrodes 2 and 3 which are fixed in the measuring arrangement and in between these one mobile central electrode 4, upon which the non-electrical, physical measuring magnitude to be sensed acts. This design arrangement forms the two partial capacitances 5 and 6. The central electrode 4 is in this example connected to the common or shared zero potential or to ground 7 of the transducer circuit 15. The differential transducer 1 was shown in the form of two variable partial capacitances 5 and 6 only for better understanding of the functional mode on which the circuitry is based.

If the measured variable to be sensed acts upon the center electrode 4, the spacing relationships in the capacitance arrangement are changed, which leads to a capacitance change in opposite directions in the two partial capacitances 5 and 6. Herewith the charging periods of the capacitances 5 and 6 also change in relationship to the measured variable acting upon them.

The partial capacitance 5 forms together with the high impedance resistance 8 an RC-member equally as the partial capacitance 6 does with the high impedance resistance 9. The charging period resulting from the RC-combinations 5 and 8 defines the switching moment of the inverting threshold value detector 10. Similar considerations apply to the RC-combinations 6 and 9 with respect to the non-inverting threshold value detector 11. If the charging periods change due to a deflection of the central electrode 4, the switching moments of the threshold value detectors 10 and 11 also move. Due to the annularly-shaped hook-up of the two RC-oscillators, these trigger one another. Because of the respective analysis of the signal courses e1 and e2 behind the two triggering circuits by means of a non-equivalence hook-up 12, there results at its output which leads directly to the signal tapping 13 of the transducer circuit 15, a pulse width modulated signal 14.

The circuitry described contains thereby two threshold value detectors 10 and 11 by way of characteristic components and a gate for a non-equivalence hook-up 12. In circuit buildup in actual practice the two threshold value detectors 10 and 11 are constituted preferably by Schmitt triggers, as has been shown in FIG. 1 by switching symbols.

The elements defining the function of this circuit arrangement are a) the two coupled RC oscillators 6 and 9 or 5 and 8, wherein the one oscillator is respectively disposed in a feedback of the other oscillator, b) two Schmitt triggers 10 and 11 connecting the two oscillators respectively with each other, wherein one of the two Schmitt triggers 10 causes in addition a level inversion, and c) a gate 12 arranged downstream for a logic non-equivalence hook-up of the two partial signals e1 and e2 present at the output of the Schmitt Triggers 10 and 11.

Thus two timing members are wired in series. The downstream located Schmitt triggers react to a positive as well as also a negative change of voltage levels u5 and u6 continuously present at their respective inputs. As a consequence there results a time delayed switchover of the voltage levels e1 and e2 present at the two inputs of the antiequivalence hook-up 12, as soon as u5 or u6 exceeds the upper switchover threshold OS of one of the two Schmitt triggers or respectively if the voltage level falls below the lower switchover threshold US, wherein the switchover moments are determined by the RC-members. The oscillating frequency of this circuitry is structurally determined by the condition C1+C2= a constant.

A pulse width modulated output signal 14 is formed in this circuit arrangement only by the logical word and data processing integration of the two partial signals e1 and e2. The solution principle described here therefore imperatively stipulates the anti-equivalence hook-up 12 in order to produce a useful measured signal.

Figure 2:
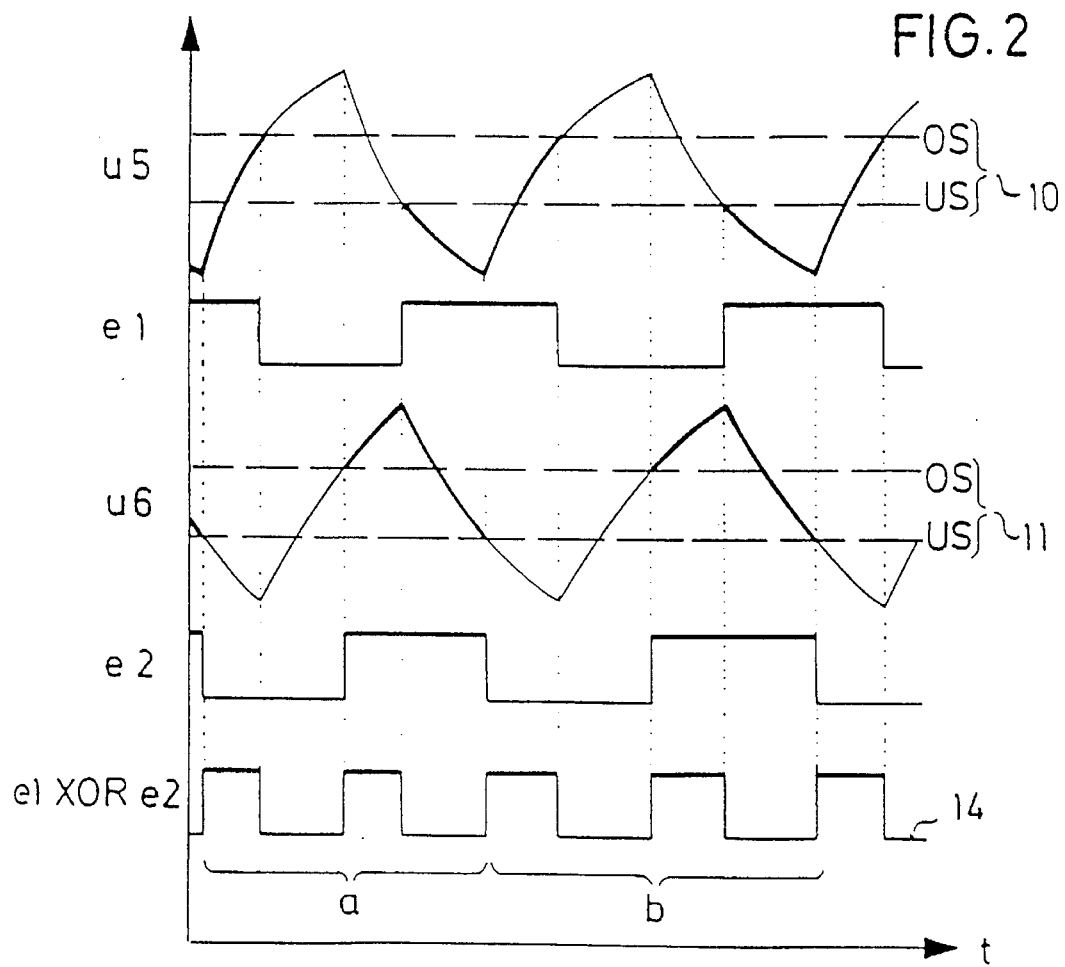
FIG. 2 shows a pertaining thereto signal curve by way of an example.

As can be seen in FIG. 2 from the course of the signal, an analysis of respectively two periods of the signal e1 or e2 is required in order to acquire an entire oscillatory period of the two partial capacitances, meaning a charging and discharging cycle. In order to thus obtain a pulse width modulated signal proportional to the measured variable, it is necessary in this type of circuit to analyze a double pulse, which is composed respectively of two complete oscillatory periods.

The capacitive transducer 1 can be for instance an acceleration sensor. If the acceleration sensor is then additionally designed micromechanically from silicon, there result together with the inventive circuitry a series of special advantages, since these two items can be easily integrated and combined with one another, so that a very compact construction can be created.

Although the circuit structure in the invention is preferably conceived for analysis of very small capacitive sensors (C<10 pF), the described solution is basically not limited to that application. Such differential transducers 1 can also be used for measuring different physical variables, for instance for pressure- or force-measurement. The specific construction of the differential transducers 1 is in the last analysis not decisive for the application of the inventive solution, whether for instance the central electrode is rotationally supported between the two electrodes 2 and 3, so that different partial faces of the central electrode 4 come to register or overlap with the fixed electrodes 2 and 3, or whether designwise a flexural-, diaphragm- or plate-oscillator is selected.

What is claimed is:

1. Circuit arrangement for an analytical function generator with a capacitive differential transducer for editing the signals measured by the differential transducer into a transmittable signal at the output of the circuit arrangement which comprises:

two coupled RC-oscillators, wherein a first of said two oscillators is arranged in the feedback of the second of said two oscillators and the capacitance of said two oscillators is formed by one of the two partial capacitances of the differential transducer, two bistable trigger circuits connecting said two oscillators with one another, wherein one of said two trigger circuits causes a level inversion; and a gate for the linkage of the partial signals appearing at the output of said two trigger circuits so that a logic twin pulse signal corresponding to the measured magnitude or variable is generated at the output of said gate.

2. The circuit arrangement according to claim 1, wherein said two bistable trigger circuits are constituted by Schmitt triggers.

3. The circuit arrangement according to claim 1, wherein said two bistable trigger circuits have very high input resistances for the largely interference-free evaluation of very small capacitances.

4. The circuit arrangement according to claim 2, wherein said two bistable trigger circuits have very high input resistances for the largely interference-free evaluation of very small capacitances.

* * * * *